United States Patent
Haynes et al.

[11] Patent Number: 6,014,116
[45] Date of Patent: *Jan. 11, 2000

[54] TRANSPORTABLE ELECTROLUMINESCENT DISPLAY SYSTEM

[75] Inventors: Bryan D. Haynes, Pacifice; Mark Lipsky, San Diego; Jay Sarno, Encinitas, all of Calif.

[73] Assignee: Add-Vision, Inc., Pacifica, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/919,703

[22] Filed: Aug. 28, 1997

Related U.S. Application Data

[60] Provisional application No. 60/024,807, Aug. 28, 1996.

[51] Int. Cl.⁷ .................................................. G09G 5/00
[52] U.S. Cl. ................................ 345/1; 345/76; 345/903
[58] Field of Search .................................. 345/1, 56, 76, 345/903; 348/7

[56] References Cited

U.S. PATENT DOCUMENTS

| | | | |
|---|---|---|---|
| H1488 | 9/1995 | Campagnuolo et al. | 342/45 |
| 2,877,371 | 3/1959 | Orthuber et al. | 313/108 |
| 2,928,974 | 3/1960 | Mash | 313/108 |
| 2,951,970 | 9/1960 | Matarese | 315/169 |
| 2,958,009 | 10/1960 | Bowerman, Jr. | 315/169 |
| 3,047,052 | 7/1962 | Fridrich | 156/580 |
| 3,052,812 | 9/1962 | Dow | 313/108 |
| 3,246,204 | 4/1966 | Katona | 315/313 |
| 3,445,827 | 5/1969 | Keyes | 340/173 |
| 3,525,091 | 8/1970 | Lally | 340/324 |
| 3,571,647 | 3/1971 | Robinson | 313/108 |
| 3,571,654 | 3/1971 | Suzuki | 315/5 |
| 3,575,634 | 4/1971 | Kohashi | 315/169 |
| 3,634,714 | 1/1972 | Anderson et al. | 313/108 A |
| 3,807,036 | 4/1974 | Fischer | 29/577 |

(List continued on next page.)

FOREIGN PATENT DOCUMENTS

| | | |
|---|---|---|
| WO 97/04398 | 7/1996 | WIPO . |
| WO 98/03896 | 8/1996 | WIPO . |
| WO 98/19208 | 10/1997 | WIPO . |
| WO 98/41898 | 3/1998 | WIPO . |
| WO 98/41899 | 3/1998 | WIPO . |
| WO 99/10767 | 8/1998 | WIPO . |
| WO 99/10768 | 8/1998 | WIPO . |
| WO 99/10769 | 8/1998 | WIPO . |

OTHER PUBLICATIONS

McGraw–Hill Encyclopedia of Science & Technology, vol. 6, pp. 139, (1987).
McGraw–Hill Encyclopedia of Science & Technology, vol. 10, pp. 63 (1987).
El History/Technical Discussion
William A. Miller, Vice President, "Ultra Thin EL Lamps Find", MKS Quantaflex, (4 pgs.).

*Primary Examiner*—Bipin H. Shalwala
*Assistant Examiner*—Ricardo Osorio
*Attorney, Agent, or Firm*—Pillsbury Madison Sutro LLP

[57] ABSTRACT

An electroluminescent display system for displaying images having an electroluminescent display unit with a plurality of electroluminescent pixels, a receiver for receiving a signal that contains information regarding an image to be displayed on the unit, a signal processor for processing the information contained in the signal and a signal cable to convey the processed signal to the electroluminescent display so as to activate selected pixels. Because of its light weight, small size and flexibility, the electroluminescent display system is conformable to any shaped surfaces and transportable.

10 Claims, 7 Drawing Sheets

U.S. PATENT DOCUMENTS

| | | | |
|---|---|---|---|
| 3,941,926 | 3/1976 | Slobodzian et al. | 178/7.3 D |
| 4,148,073 | 4/1979 | Slobodzian et al. | 358/240 |
| 4,323,896 | 4/1982 | Fiedler et al. | 340/800 |
| 4,511,894 | 4/1985 | Johnston | 340/756 |
| 4,670,690 | 6/1987 | Ketchpel | 313/505 |
| 4,689,604 | 8/1987 | Sokol | 340/755 |
| 4,814,668 | 3/1989 | Tohda et al. | 313/506 |
| 4,929,870 | 5/1990 | Harju | 315/169.3 |
| 4,975,692 | 12/1990 | Tateyama | 340/781 |
| 5,066,893 | 11/1991 | Osada et al. | 315/169.3 |
| 5,359,341 | 10/1994 | Hutchings | 345/45 |
| 5,400,047 | 3/1995 | Beesely | 313/503 |
| 5,485,145 | 1/1996 | Sniff | 340/815.4 |
| 5,493,183 | 2/1996 | Kimball | 315/308 |
| 5,508,585 | 4/1996 | Butt | 313/509 |
| 5,510,811 | 4/1996 | Tobey et al. | 345/157 |
| 5,523,769 | 6/1996 | Lauer et al. | 345/1 |
| 5,565,733 | 10/1996 | Krafcik et al. | 313/510 |
| 5,566,384 | 10/1996 | Chien | 362/84 |
| 5,598,058 | 1/1997 | LaPointe | 313/503 |
| 5,634,080 | 5/1997 | Kikinis et al. | 395/893 |
| 5,814,417 | 9/1998 | Nagayama | 428/690 |

TRANSPORTABLE ELECTROLUMINESCENT DISPLAY SYSTEM

This application claims the benefit of U.S. Provisional application No. 60/024,807, filed Aug. 28, 1996, which is incorporated herein by reference.

BACKGROUND OF THE INVENTION

1. Field of the Invention

The present invention relates to an electronic display system and circuitry for controlling the display. In particular, the invention relates to a display system employing an arrangement of electroluminescent pixels for displaying alphanumeric symbols or other characters and electronic circuitry for their control.

2. Description of the Related Art

Conventional display systems employ matrixes of either incandescent bulbs (see, for example, U.S. Pat. Nos. 3,941,926 and 4,148,073 to Slobodzian et al.) or light-emitting diodes (see, for example, U.S. Pat. No. 4,323,896 to Fiedler et al.) to display alpha-numeric symbols, characters or pictorial representations. In such display systems, individual bulbs or light-emitting diodes are typically arranged in a matrix of horizontal rows and vertical columns and the matrix is connected to electronic circuitry that serves to activate individual bulbs or diodes. The circuitry selectively controls the activation of an appropriate combination of individual bulbs or diodes to create the desired alpha-numeric, character or pictorial image. Through the proper selection and timing of bulb or diode activation, images or messages which appear to scroll across the display system can be created.

There are significant drawbacks associated with display systems based on incandescent lamps, namely their fragility, consumption of significant amounts of electrical power, excessive bulk and weight. Light emitting diode (LED) based display systems are also bulky and heavy, as well as being limited in size. The excessive bulk and weight of these boards restrict their transportability and usability in applications requiring large scale displays. In addition, both incandescent and light-emitting diode-based display systems are rigid, thereby precluding their use on curved or irregular shaped surfaces.

Electroluminescent lamps employing phosphors that luminesce when subjected to electric fields are known. Until now, the use of electroluminescent lights has, however, been limited to single light "strips" which require the additional use of patterned sleeves for the display of predetermined messages (see U.S. Pat. No. 5,566,384 to Chien).

Still needed in the field is a display system that is light weight, small in size, low in power consumption, scalable, and flexible, and therefore can be easily transported and used on any shaped surfaces.

SUMMARY OF THE INVENTION

The present invention provides a display system which includes an electroluminescent display unit with a plurality of electroluminescent pixels, a receiver for receiving a signal that contains information regarding an image to be displayed on the unit, a signal processor for processing the information contained in the signal and means for providing the processed signal to the electroluminescent display so as to activate selected pixels of the plurality of electroluminescent pixels in order to display the image.

The invention also provides an electroluminescent display system which includes an electroluminescent display unit with a plurality of electroluminescent pixels, a signal source for providing a signal that contains information regarding an image to be displayed on the unit, a transmitter for gathering the signal from the source, a receiver for receiving the signal from the transmitter, a signal processor for processing the information contained in the signal and means for providing the processed signal to the electroluminescent display so as to activate selected pixels of the plurality of electroluminescent pixels to display the image.

The invention also provides the systems as described above wherein the display includes a plurality of panels and each of the plurality of panels has a matrix of electroluminescent pixels arranged in horizontal rows and vertical columns.

A better understanding of the features and advantages of the present invention will be obtained by reference to the following detailed description and accompanying drawings which set forth illustrative embodiments in which the principles of the invention are utilized.

DETAILED DESCRIPTION OF THE PREFERRED EMBODIMENTS

Electroluminescent lamps are lightweight compared to other light sources, can be printed on flexible cloth-like substrates and may be fabricated in a flat and thin configuration. They also consume less power than incandescent bulbs. These characteristics of electroluminescent lamps provide several benefits in the present inventive electroluminescent display system, including (i) a display system that can be applied and conformed to irregular or curved surfaces, (ii) a display system that can be easily transported on lighter-than-air craft, (iii) a display system that can be scaled to any desired size, (iv) a display system that can be supported by a structure with limited load bearing capability, (v) a display system that is very thin and (vi) a display system that consumes a relatively small amount of power per unit of light emitting area as compared to other display light systems.

A typical example electroluminescent panel, according to the present invention, having a 5×7 matrix of 2" round pixels is 14"×20" in size and weighs on an average 0.422 g/in$^2$. Such an example panel will typically provide more than 10 foot lamberts of light per square inch of light emitting surface while operating at 1200 hertz, 90 volts, and 0.5 to 1.5 milliamps per square inch of light emitting surface. Thus, an example sixteen panel display would only draw from approximately 160 to 500 milliamps of current depending on the number of pixels that are lit. This example demonstrates that much larger and brighter panels can be constructed well within the operating capabilities of electroluminescent lamps.

Electroluminescent lamps are described in more detail in the following applications, all of which are fully incorporated herein by reference: (1) application Ser. No. 08/591,014, filed Jan. 25, 1996; (2) application Ser. No. 08/698,973, filed Aug. 16, 1996; (3) application Ser. No. 08/783,732, filed Jan. 16, 1997; and (4) application titled "Electroluminescent Lamp Design" by inventors Bryan D. Haynes, Michael C. Feldman and Matthew C. WIlkinson, filed Aug. 13, 1996 (Attorney Docket Number AVI-140).

Figure 1:
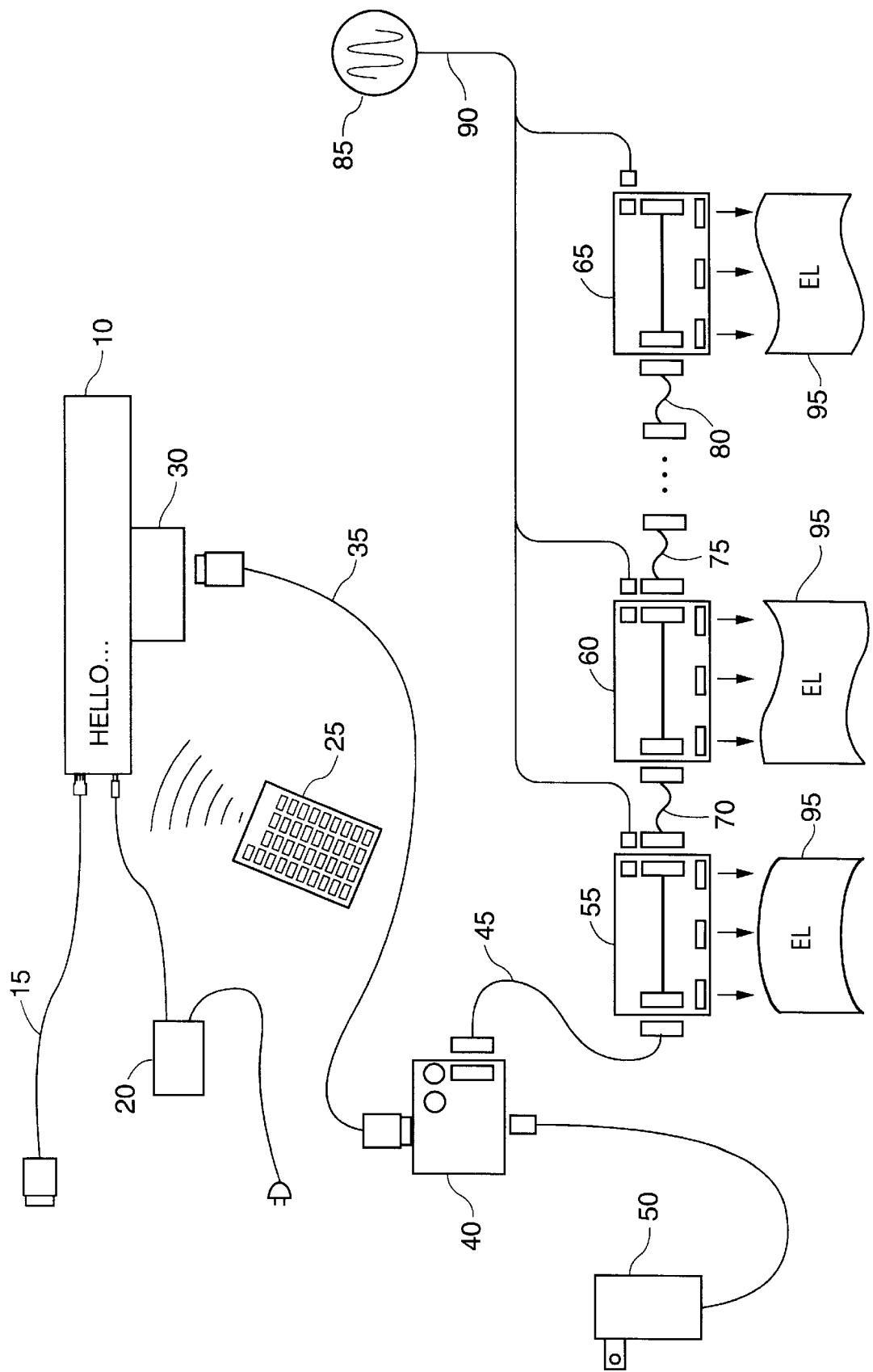
FIG. 1 is a block diagram illustrating an embodiment of the invention.

Turning to FIG. 1, an embodiment of the present invention is depicted in a block diagram. In the embodiment pictured, the display system includes driver circuitry that receives display information signals from a miniature scrolling board 10. A commercially available miniature scrolling board 10 that could be used is Model No. PL-M2012R Tru-Color II, manufactured by Pro-Lite Inc. of Santa Ana, Calif. It will be understood by one skilled in the art that any miniature scrolling board 10 can be used to provide display information signaling and further, the invention can be implemented without the use of a miniature scrolling board at all. Instead, a personal computer or other information signal generating device can be used. As can be seen in FIG. 1, the electroluminescent panels 95 need not be planar and can be applied and conformed to irregular or curved surfaces.

The miniature scrolling board 10 shown in FIG. 1 provides for two different alternative display information input sources. First, via line 15, a personal computer or other data processing device can be coupled to the miniature scrolling board 10 to provide display information to the display system. Second, via a remote control keypad 25 and a remote control signal receiver (not pictured) within the miniature scrolling board 10, display information can be sent to the display system. The miniature scrolling board 10 receives power via power supply 20 which is connected to a power source such as a conventional wall outlet or in transportable applications; battery or generator systems.

FIG. 1 further depicts a transmitter 30 coupled to the miniature scrolling sign 10. The transmitter 30 transmits the display information signaling from the miniature scrolling sign 10 to a receiver 40 via transmission line 35. The receiver 40 is coupled to the first of a series of daisy-chained information signal processing modules 55, 60, 65 by line 45. The information signal processing modules 55, 60, 65 are linked together via connector lines 70, 75, 80. In other words, the information signal processing modules 55, 60, 65 and the connector lines 70, 75, 80 form a data bus that carries the display information signaling to each information signal processing module 55, 60, 65.

The information signal processing modules 55, 60, 65 interpret the display information signaling traveling along the data bus which is sent from the miniature scrolling sign 10 via the transmitter 30 and receiver 40. Based on the display information signaling, the information signal processing modules 55, 60, 65 control which electroluminescent segments (or pixels) of an electroluminescent panel associated with the particular information signal processing module 55, 60, 65 are to be illuminated by allowing power to flow from an alternating current power supply 85. In other words, the information signal processing modules 55, 60, 65 act as gates (or switches), controlled by the display information signal to control the flow of AC electricity to the electroluminescent segments.

While the connector lines 70, 75, 80 are relatively short in the pictured embodiment, the distance between the modules and the total number of modules can be increased by installing a buffer cable (see FIG. 7) between the modules in place of the existing connector line. The buffer cable amplifies the signal to overcome any attenuation caused by the extended length of the conductor.

Each information signal processing module 55, 60, 65 is also connected in parallel to an alternating current power source 85 via power line 90. The power line 90 is further branched within each information signal processing module 55, 60, 65 to provide switched power to each distinct segment of the signal processing module's associated electroluminescent panel (not shown).

The particular embodiment shown in FIG. 1 is designed to work with electroluminescent display units which include 16 electroluminescent panels with each panel having an X-Y matrix of electroluminescent pixels. While the panel for use with the FIG. 1 embodiment of the invention uses a 5×7 matrix of pixels, any size X-Y matrix or other arrangement of electroluminescent segments can be used according to the invention. The number of panels, panel size, number of pixels, pixel size, and pixel arrangement will depend on the conditions under which the board is used, e.g. viewing distance, light conditions, required image resolution, etc. Further, the individual electroluminescent segments may be of any shape or size and, in order to make larger individual pixels, separate electroluminescent lamps may be connected.

Figure 2:
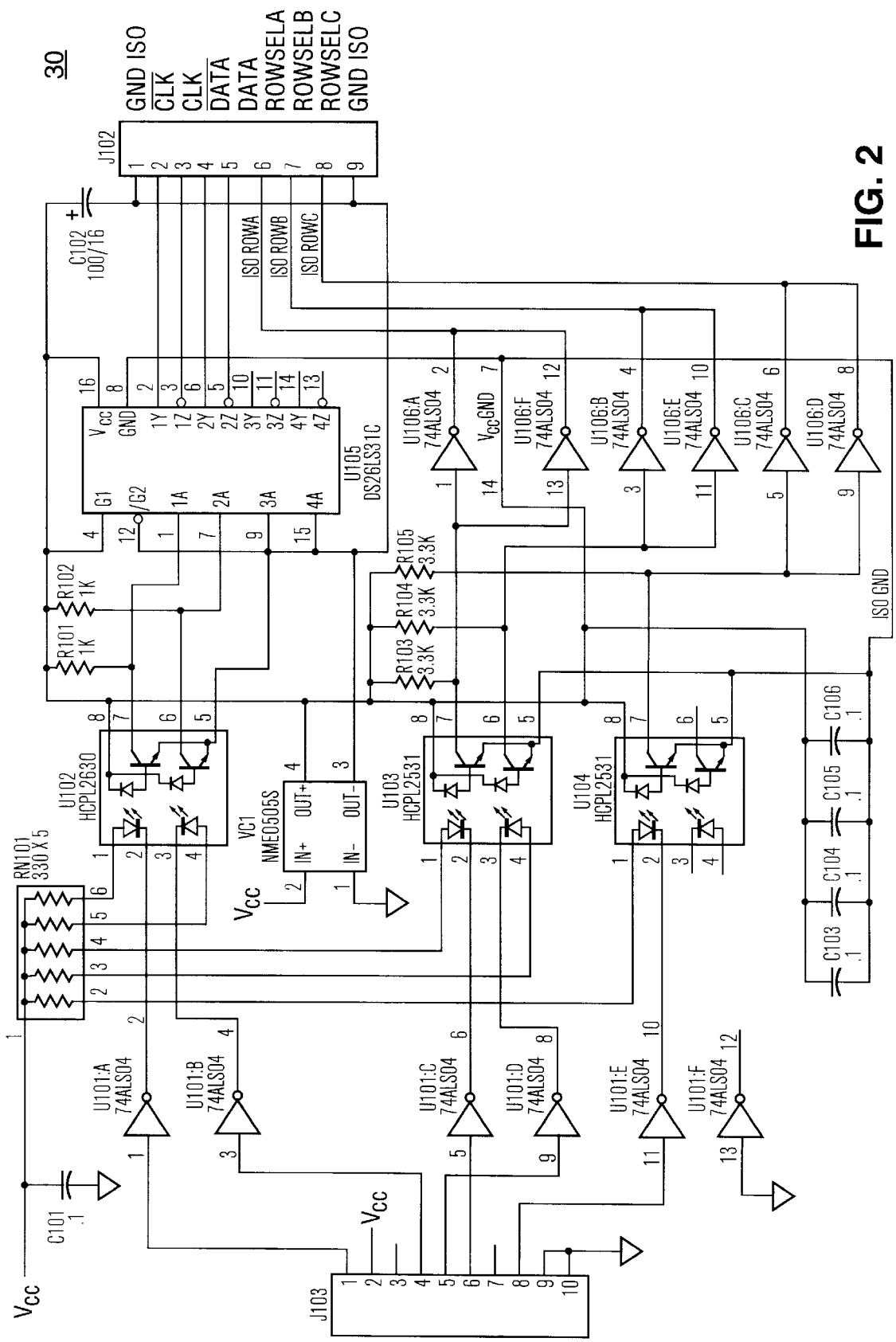
FIG. 2 is circuit diagram of a transmitter of an embodiment of the invention.

Turning now to FIG. 2, a circuit diagram of an embodiment of the transmitter 30 is shown. Jumper block J130 is connected to the internal circuitry of the miniature scrolling board 10 and provides access to the display information signals within the miniature scrolling board 10. The particular signals of the disclosed embodiment include three row select display information signals that can be decoded to indicate which of the seven rows include a segment or pixel that will be illuminated and two column select display information signals that can be decoded to indicate which of the five columns include a segment or pixel that will be illuminated. The transmitter 30 includes an optical isolation circuit U102, U103, U104 connected to the jumper block J130 which insulates the rest of the system from the potential damage caused by electrical spikes. The transmitter also includes line drivers U105 and U106 connected to the output of the optical isolation circuit U102, U103, U104 that buffer the signals and output them on the transmission line 35 to the receiver 40.

Figure 3:
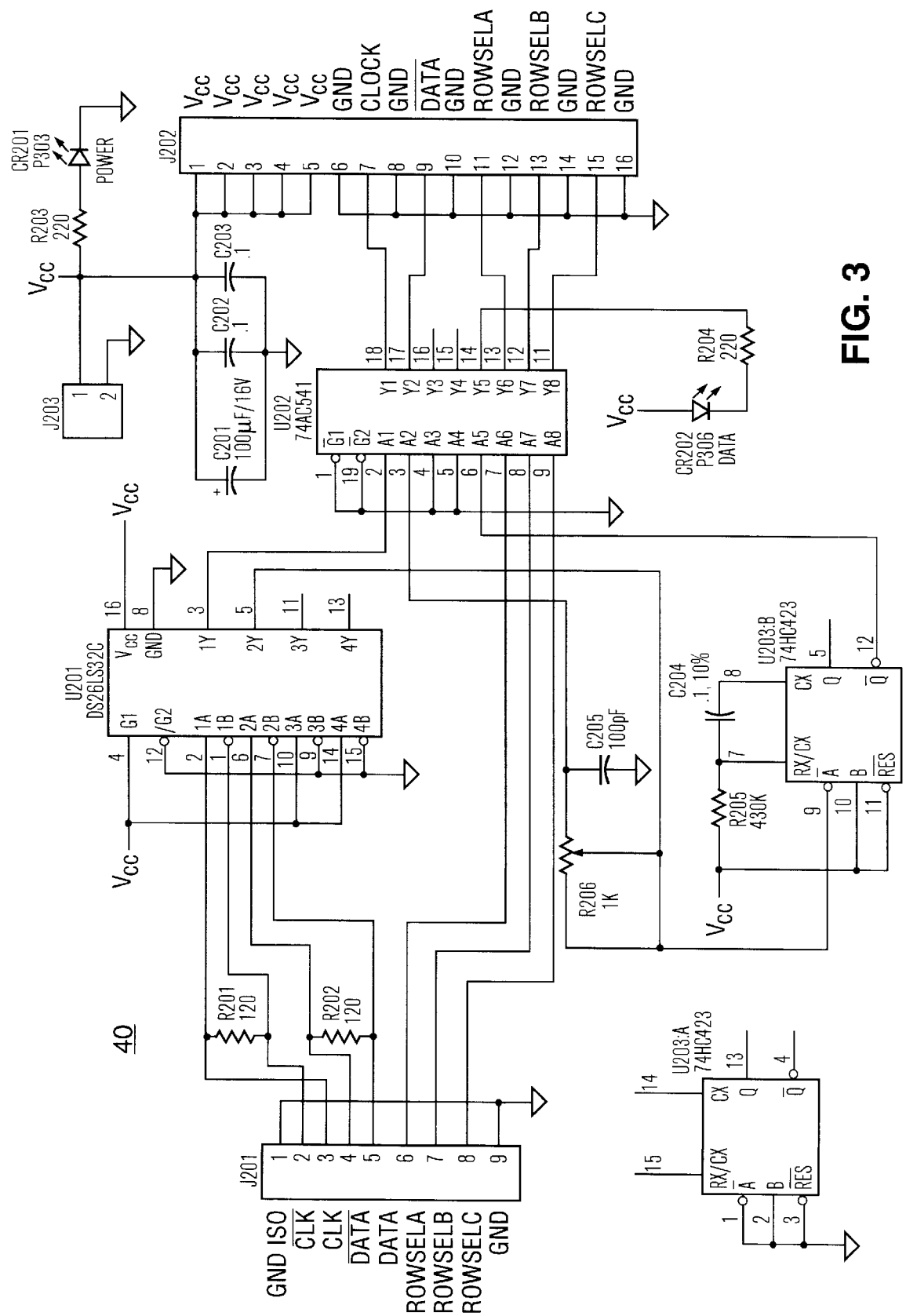
FIG. 3 is circuit diagram of a receiver of an embodiment of the invention.

FIG. 3 shows a circuit diagram of a corresponding embodiment of the receiver 40. The receiver 40 includes a pass-through line driver U202 that buffers the row select signals ROWSELA, ROWSELB, ROWSELC and feeds them into the data bus. The two column select signals include a clock signal CLOCK and data signal DATA. In this particular embodiment, the data signal is a serial bit stream indicating the desired state of adjacent pixels in a given row.

To correct any signal skew after transmission, the clock signal is passed through a skew adjustment circuit U203B before the column select signals are passed to the line driver U202 and then fed to the data bus.

Figure 4:
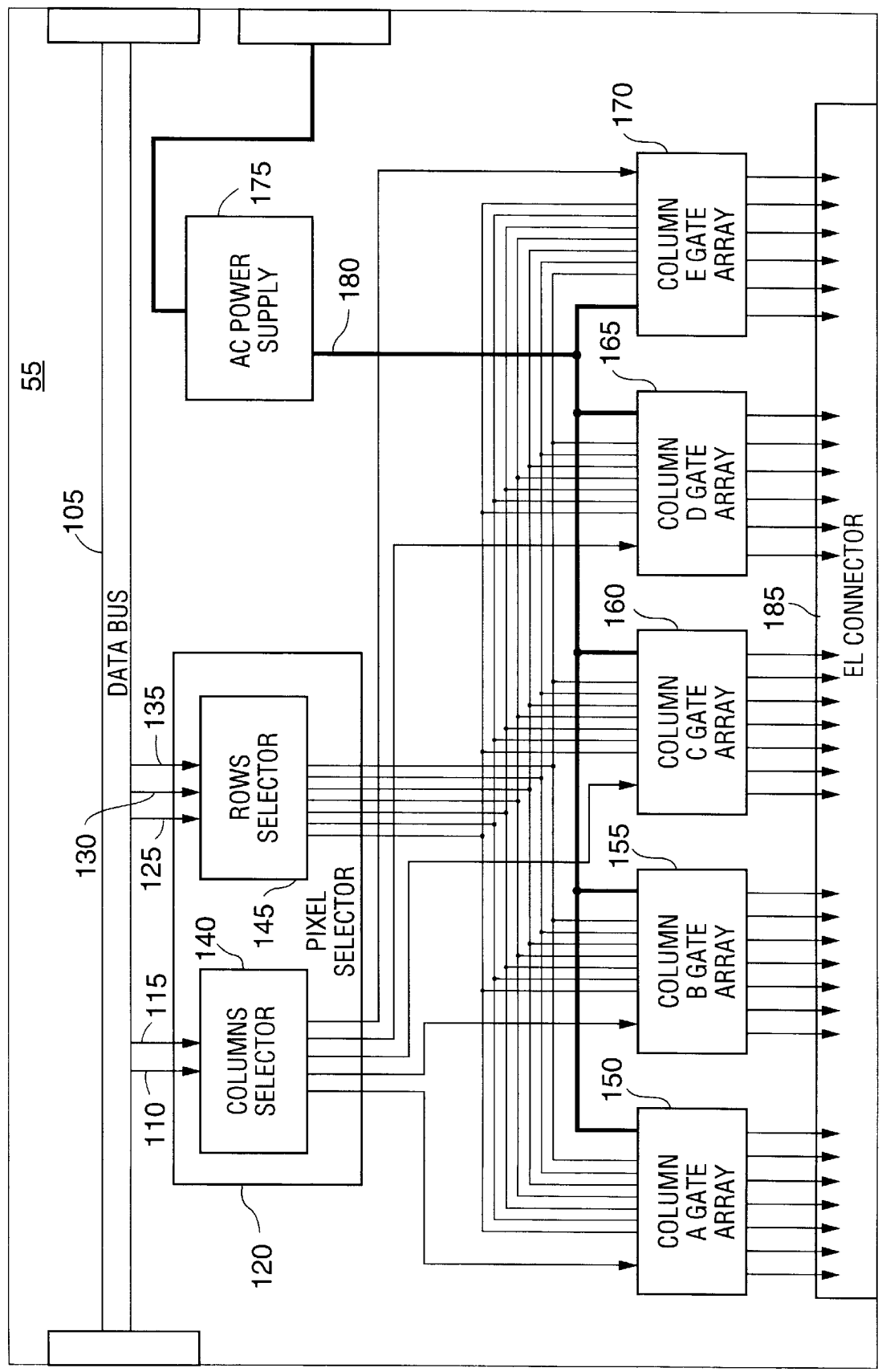
FIG. 4 is a block diagram of a processor of an embodiment of the invention.

FIG. 4 is a more detailed block diagram of an information signal processing module 55. Recall that each information signal processing module 55 has a corresponding electroluminescent panel that it drives. Note that all of the information signal processing modules 55, 60, 65 are identical to each other and function in the same way. Thus, it should be understood that the following description regarding information signal processing module 55 applies to the other information signal processing modules as well.

Referring to both FIGS. 1 and 4, the data bus 105 is depicted as spanning across the information signal processing module 55 where the left end of the data bus 105 is connected to the output of the receiver 40 via line 45 and the right end of the data bus is connected to the next information signal processing module 60 via a connector line 70.

The information signal processing module 55 includes a pixel selector 120 and a gate array 150, 155, 160, 165, 170 for each column of pixels in the 5×7 matrix. The pixel selector 120 includes a columns selector 140 and a rows selector 145. The pixel selector 120 receives the three row selection display information signals from the data bus 105 via lines 125, 130, 135. The pixel selector 120 receives the two column selection display information signals from the data bus 105 via lines 110 and 115.

Figure 5:
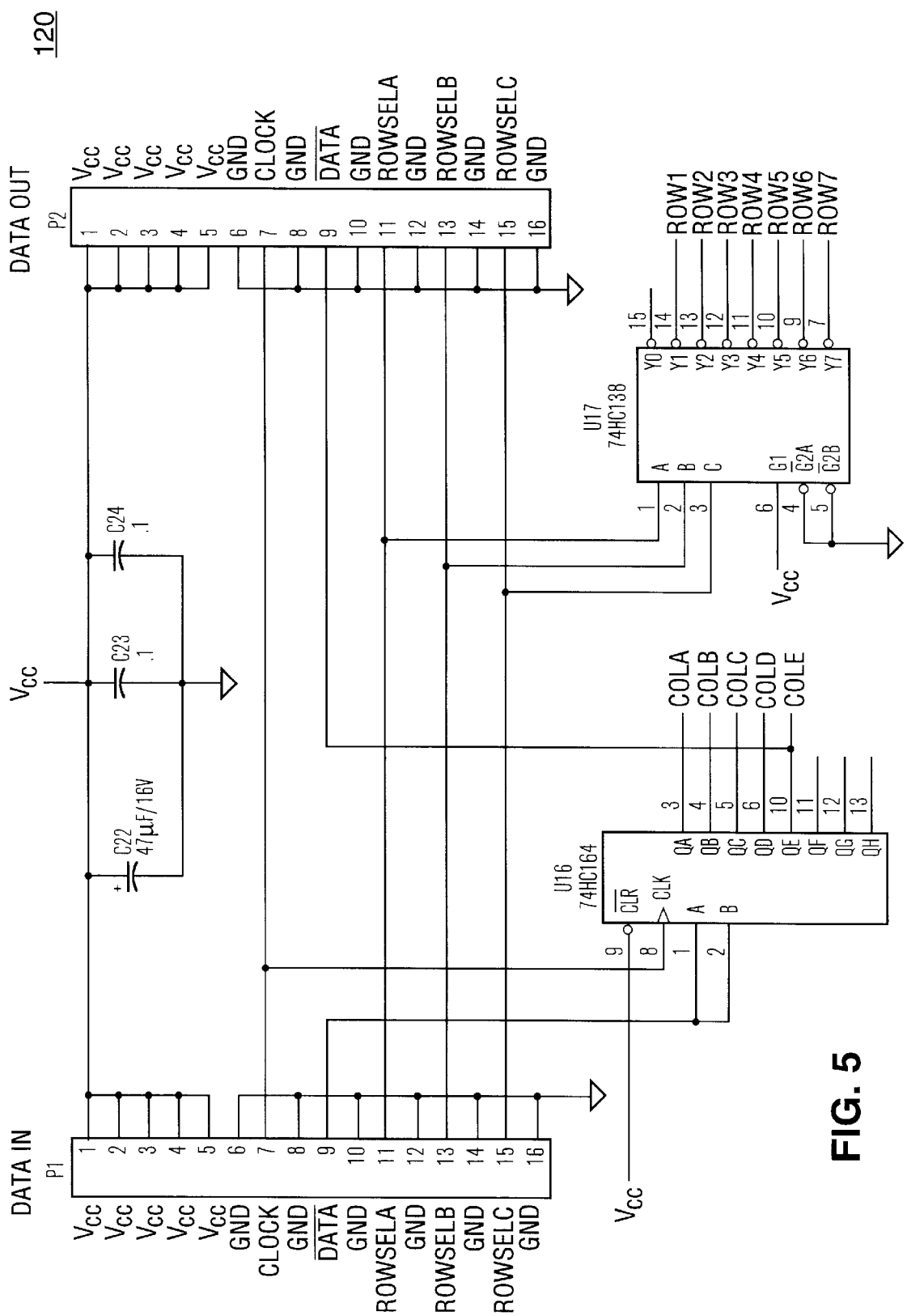
FIG. 5 is a circuit diagram of a pixel selector of an embodiment of the invention.

Turning to FIG. 5, an embodiment a circuit implementing the pixel selector is shown. The rows selector 145 in this embodiment is a three to eight decoder U17 while the columns selector 140 is an eight bit serial to parallel converter/shift register U16. The three to eight decoder U17 takes the three row selection display information signals from the data bus 105 as inputs and activates the appropriate ROW signals as outputs.

The eight bit serial to parallel converter/shift register U16 takes the two column selection display information signals from the data bus 105 as inputs, shifts the data though, and activates the appropriate COL signals as outputs. The last output is also sent back to the data bus to the next module. As with the three to eight decoder U17, the eight bit serial to parallel converter U16 has more capacity than necessary for a five column pixel matrix.

Referring again to FIG. 4, at this point, the correct state of each pixel in the 5×7 grid can be determined by logically combining together each columns selector 140 output with each rows selector output as indicated by the gate array blocks 150, 155, 160, 165, 170. Each gate in the gate array blocks 150, 155, 160, 165, 170 has an associated pixel on the panel. Essentially, each row and column pair controls a switch, that when closed, allows power to flow from the AC power supply 175, over the power line 180, and through the gate to charge the corresponding pixel.

Figure 6:
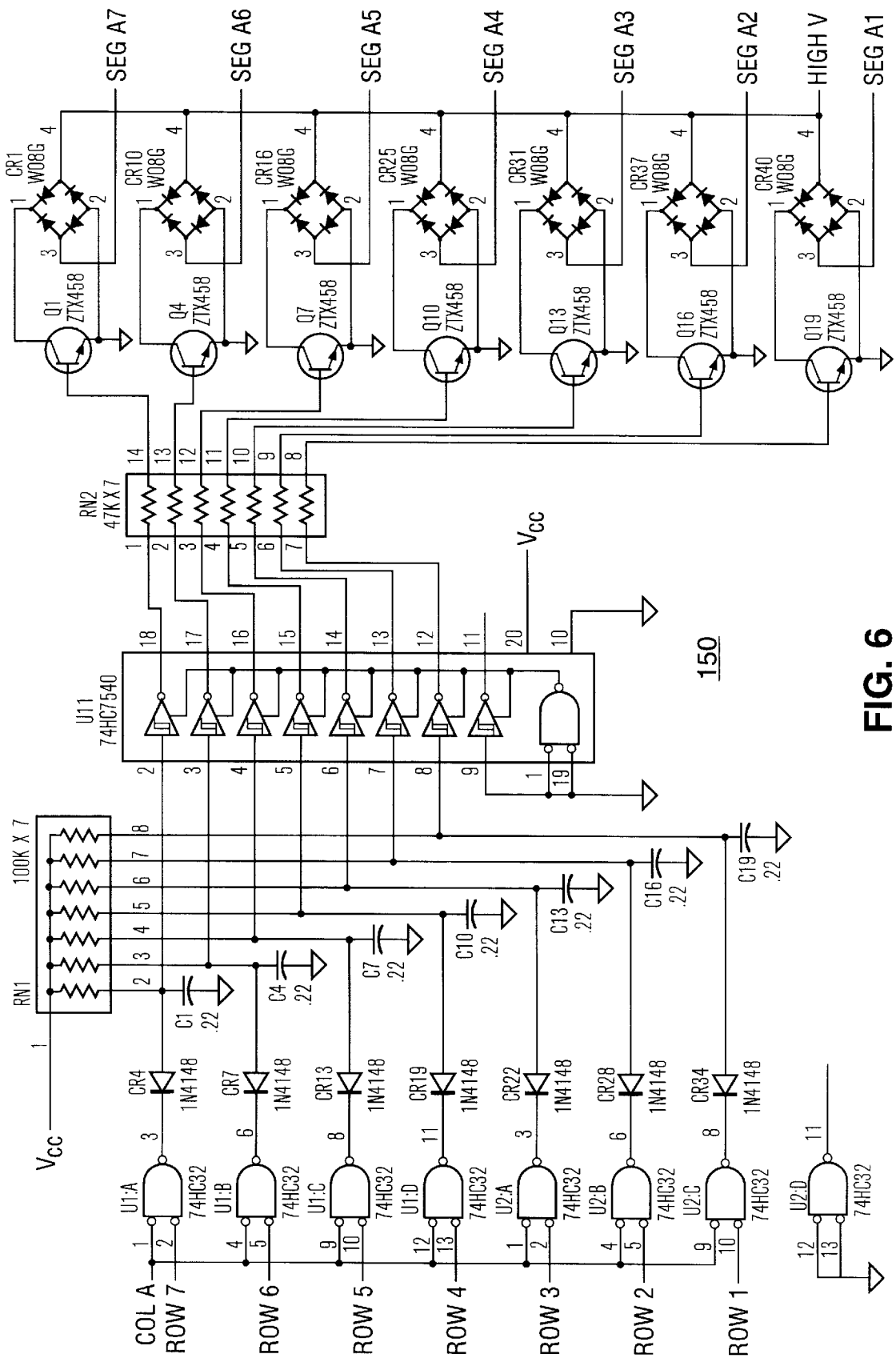
FIG. 6 is a circuit diagram of a panel driving module of an embodiment of the invention.

Turning to FIG. 6, a circuit diagram of an embodiment of the gate array 150 of FIG. 4 is shown. Row and column signals are combined together using AND gates U1, U2. If the result of the ANDing is that the pixel is to be illuminated, a brief pulse is output to the RC circuit RN1, C4. Component values are selected such that the pulse causes the capacitor CR4 to charge up and hold a voltage level for a predetermined time. The effect is to convert the pulse out of the OR gate U1 into a level signal that switches the transistor Q1 for the desired amount of time such that sufficient alternating current from the power supply 175 flows to the electroluminescent pixel to light it for the desired amount of time.

Figure 7:
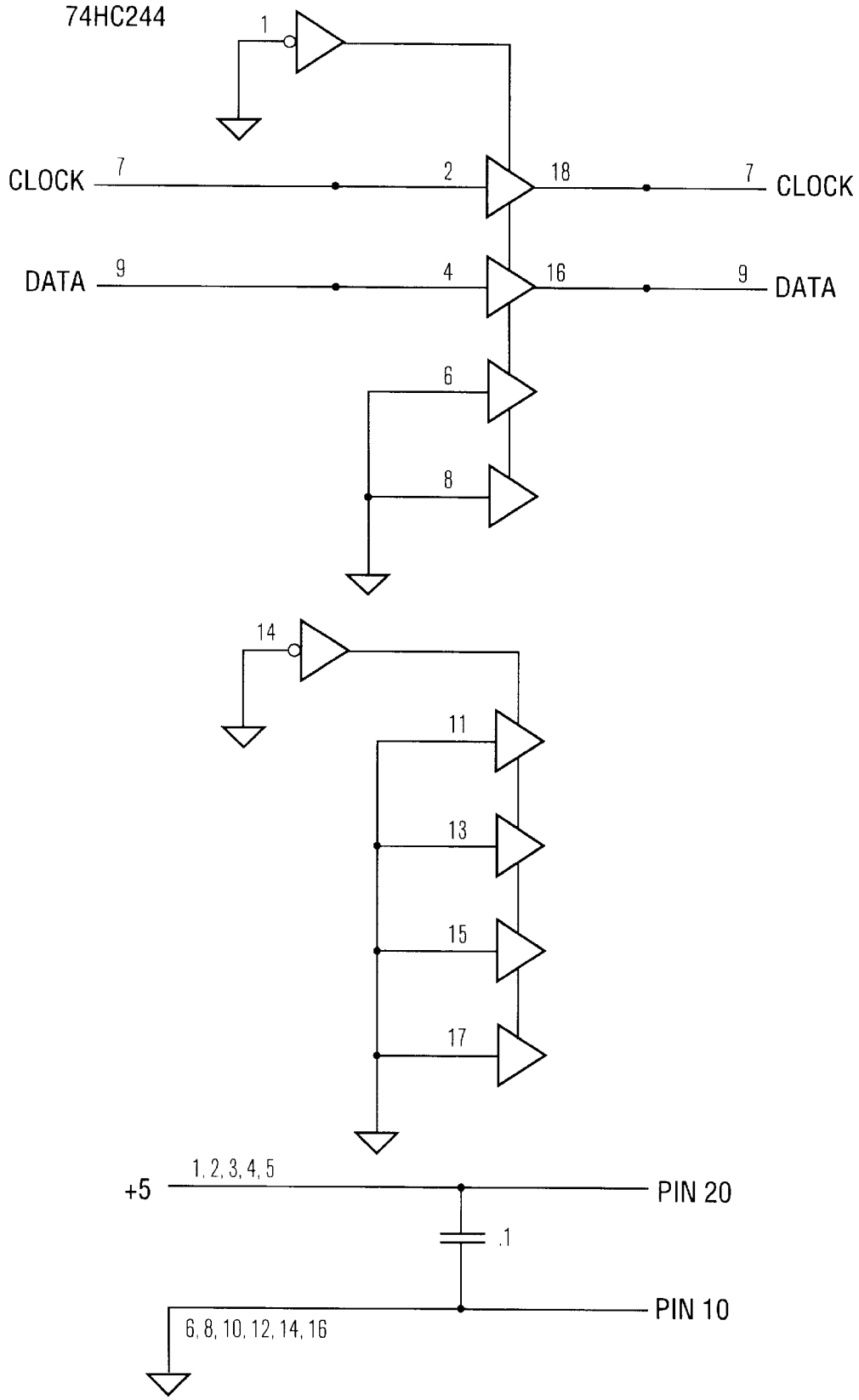
FIG. 7 is a circuit diagram of a buffer cable of an embodiment of the invention.

FIG. 7 depicts an embodiment of a buffer cable circuit used to re-amplify the column selection display information signal when it is desired to have many information signal processing modules 55, 60, 65 daisy chained together or the distances between the modules 55, 60, 65 is large. A buffer cable as shown in FIG. 7 can be used in place of a connection line 70, 75, 80 as needed.

In another embodiment, the electroluminescent pixels are fabricated on a flexible substrate as described in provisional application No. 60/023,923, filed Aug. 13, 1996, which is incorporated herein by reference.

It should be understood that various alternatives to the embodiments of the invention described herein may be employed in practicing the invention. It is intended that the following claims define the scope of the invention and that structures within the scope of these claim and their equivalents by covered thereby.

What is claimed is:

1. A display system having a display portion conformable to a plurality of surfaces shaped differently from one another, the system being for creating and displaying images and comprising:

an electroluminescent display unit conformable to irregular or curved surfaces and having a plurality of electroluminescent pixels to create an image to be displayed;

a receiver for receiving a signal, the signal containing information regarding the image to be displayed on the electroluminescent display unit;

at least one signal processor for processing the information in the signal; and means for providing the processed information to the electroluminescent display unit to activate selected pixels of the plurality of electroluminescent pixels to display the image, wherein the selected pixels are activated based on the information in the signal.

2. The display system of claim 1 further comprising:

a transmitter for gathering the signal and transmitting the signal to the receiver; and a source from which the signal is gathered by the transmitter.

3. The display system of claim 1, wherein the electroluminescent display unit includes a plurality of panels, each of the plurality of panels including a matrix of the electroluminescent pixels arranged in rows and columns.

4. A display system having a display portion conformable to a plurality of surfaces shaped differently from one another, the system comprising:

an electroluminescent display conformable to irregular or curved surfaces and having a plurality of pixels thereon;

a receiver for receiving an input signal, the input signal being representative of information identifying positions of ones of said plurality of pixels on the electroluminescent display;

a signal processor for processing the input signal; and means for providing the processed signal to the electroluminescent display to activate appropriate pixels to create an image on the electroluminescent display.

5. The display system of claim 4, wherein the electroluminescent display includes a plurality of electroluminescent panels.

6. The display system of claim 5, wherein the signal processor includes a plurality of modules, one module for each electroluminescent panel, to drive said plurality of electroluminescent panels and a connector connecting the plurality of modules in series to provide the processed input signal to the plurality of electroluminescent panels.

7. The display system of claim 6, wherein at least one of the modules includes:

a microcontroller for receiving the processed input signal and generating an output signal;

a power supplying circuit for supplying power of an appropriate magnitude and frequency to drive the electroluminescent display; and a selection circuit connected to receive the output signal from the microcontroller and to receive the power from the power supplying circuit, the selection circuit selectively providing the power to the electroluminescent display based on the output signal from the microcontroller.

8. A display including a portion conformable to a plurality of surfaces shaped differently from one another, the display comprising:

a miniature scrolling sign for generating a display information signal;

a circuit coupled to the miniature scrolling sign including a transmitter, a receiver and a communication channel between said transmitter and said receiver;

an electroluminescent message board conformable to irregular or curved surfaces and including a plurality of bendable panels;

an AC power supply coupled to the electroluminescent panels;

a plurality of modules serially coupled together to form a series of modules, one module for each electroluminescent display panel, to drive said plurality of electroluminescent panels;

wherein the receiver is coupled to a first module in the series of panel driving modules, said transmitter being for receiving the display information signal from said miniature scrolling sign and communicating said signal to said receiver through said communication channel, whereby said display information signal is provided to said plurality of modules.

9. A method for displaying messages on a display system having a display portion conformable to a plurality of surfaces shaped differently from one another, the method comprising:

receiving a signal;

processing the signal;

providing the processed signal to an electroluminescent display conformable to an irregular or curved surface and having a plurality of pixels, said signal being representative of a message; and activating a set of the pixels on the electroluminescent display based on the signal to create the message.

10. A method as recited in claim 9, wherein processing the signal includes:

receiving data in the signal serially;

holding the data; and outputting the data in parallel, at a predetermined time, to the electroluminescent display.

* * * * *